United States Patent

Engels et al.

[11] Patent Number: 6,107,269
[45] Date of Patent: Aug. 22, 2000

[54] PROCESS FOR THE PREPARATION OF GRANULAR WASHING OR CLEANING AGENTS AND CONSTITUENTS THEREFOR

[75] Inventors: Henrich Engels, Hilden; Michael Marschner, Neuss, both of Germany

[73] Assignee: Henkel Kommanditgesellschaft auf Aktien, Duesseldorf, Germany

[21] Appl. No.: 09/101,490

[22] PCT Filed: Dec. 20, 1996

[86] PCT No.: PCT/EP96/05782

§ 371 Date: Jul. 9, 1998

§ 102(e) Date: Jul. 9, 1998

[87] PCT Pub. No.: WO97/25406

PCT Pub. Date: Jul. 17, 1997

[30] Foreign Application Priority Data

Jan. 9, 1996 [DE] Germany .................... 196 00 466

[51] Int. Cl.⁷ ................................ C11D 11/00
[52] U.S. Cl. .................... 510/444; 510/457; 264/117
[58] Field of Search ........................ 510/444, 457; 264/117

[56] References Cited

U.S. PATENT DOCUMENTS

| | | | |
|---|---|---|---|
| 3,782,906 | 1/1974 | Pierce ............................ | 23/313 |
| 4,179,221 | 12/1979 | Lucke ............................ | 366/309 |
| 4,229,110 | 10/1980 | Lucke ............................ | 366/343 |
| 4,246,220 | 1/1981 | Lamond et al. ................. | 264/117 |
| 4,320,979 | 3/1982 | Lucke ............................ | 366/325 |
| 4,414,130 | 11/1983 | Cheng ........................... | 510/532 |
| 4,427,417 | 1/1984 | Porasik ......................... | 23/313 R |
| 4,528,276 | 7/1985 | Cambell et al. ................ | 502/62 |
| 4,674,887 | 6/1987 | Lucke et al. ................... | 366/325 |
| 4,816,553 | 3/1989 | Baur et al. .................... | 528/245 |
| 4,846,409 | 7/1989 | Kasper et al. ................. | 241/21 |
| 4,860,960 | 8/1989 | Schwarz ........................ | 241/893 |
| 5,275,485 | 1/1994 | Luke ............................ | 366/149 |
| 5,286,470 | 2/1994 | Delwel .......................... | 423/332 |
| 5,407,273 | 4/1995 | Wilson .......................... | 366/313 |
| 5,413,284 | 5/1995 | Hirz et al. .................... | 241/15 |
| 5,494,488 | 2/1996 | Arnoldi et al. ................ | 8/137 |
| 5,554,587 | 9/1996 | Capeci .......................... | 510/444 |
| 5,580,941 | 12/1996 | Krause et al. ................. | 527/300 |
| 5,637,560 | 6/1997 | Raehse et al. ................. | 510/443 |
| 5,714,451 | 2/1998 | Brouwer et al. ................ | 510/324 |

FOREIGN PATENT DOCUMENTS

| | | |
|---|---|---|
| 94 58592 | 8/1994 | Australia . |
| 0 111 807 | 6/1984 | European Pat. Off. . |
| 0 264 049 | 4/1988 | European Pat. Off. . |
| 0 280 223 | 8/1988 | European Pat. Off. . |
| 0 340 013 | 11/1989 | European Pat. Off. . |
| 0 352 135 | 1/1990 | European Pat. Off. . |
| 0 395 354 | 10/1990 | European Pat. Off. . |
| 0 526 978 | 2/1993 | European Pat. Off. . |
| 27 05 077 | 8/1978 | Germany . |
| 27 29 477 | 1/1979 | Germany . |
| 28 01 460 | 7/1979 | Germany . |
| 33 44 531 | 6/1985 | Germany . |
| 37 28 710 | 3/1989 | Germany . |
| 39 35 290 | 10/1989 | Germany . |
| 41 15 496 | 11/1992 | Germany . |
| 41 24 984 | 2/1993 | Germany . |
| 42 21 381 | 2/1994 | Germany . |
| 43 00 772 | 7/1994 | Germany . |
| 43 03 320 | 8/1994 | Germany . |
| 43 19 578 | 12/1994 | Germany . |
| 44 17 734 | 11/1995 | Germany . |
| 349 007 | 5/1931 | United Kingdom . |
| 911 067 | 11/1962 | United Kingdom . |
| WO93/16164 | 8/1993 | WIPO . |

OTHER PUBLICATIONS

Chem. Inq. Tech. 60 (12):986–994 (1988).
Die Ernaehrungs industrie 1/2:16–18 (1994).
Raempp Chemielexikon 9 (2) : 1447 (1990).
DIN ISO 3310 (Feb. 1992).
DIN ISO 697 (Jan. 1994).

*Primary Examiner*—Lorna M. Douyon
*Attorney, Agent, or Firm*—Wayne C. Jaeschke; Real J. Grandmaison; Glenn E. J. Murphy

[57] ABSTRACT

A process for producing granular detergents, cleaners or components thereof from dust-like solids having a particle size distribution such that at least 5% by weight of the solids have a diameter smaller than 0.1 mm, by placing the solids in a moving mixer and adding water in its vaporous state to the solids whereby the water in its vaporous state forms liquid water in situ on at least part of the solids in an amount of from 0.1% to 2% by weight, based on the weight of the granular detergents, cleaners or components thereof.

10 Claims, No Drawings

PROCESS FOR THE PREPARATION OF GRANULAR WASHING OR CLEANING AGENTS AND CONSTITUENTS THEREFOR

BACKGROUND OF THE INVENTION

1. Field of the Invention

This invention relates to a process for the production of granular detergents/cleaners or components thereof in a mixer used as a granulator with the assistance of a granulation aid.

2. Discussion of Related Art

European patent application 0 264 049 relates to a process for the production of granules by pan granulation in positive mixers and subsequent drying in a fluidized bed, characterized in that the powder-form material to be granulated—optionally formed with standard auxiliaries—is continuously granulated in a high-speed mixer/granulator with the aid of a granulation liquid, preferably water, the product obtained is immediately delivered to a low-speed mixer/granulator for regranulation and is then dried and, at the same time, sprayed with a forming aid, preferably a binder-containing liquid, in a fluidized-bed dryer.

EP-A-0 340 013 describes a granular detergent composition or a component thereof which is characterized in that it has a bulk density of at least 650 g/l and contains 17 to 35% by weight of a non-soap-like surfactant consisting at least partly of an anionic surfactant, 28 to 45% by weight (based on dry matter) of a crystalline or amorphous sodium alumosilicate, the ratio by weight of the alumosilicate to surfactant being 0.9:1 to 2.6:1 and other surfactant components optionally being present to 100% by weight. This composition is obtained by subjecting the above-mentioned surfactant and the above-mentioned alumosilicate both to a stirring motion and to a cutting motion in the presence of a liquid binder in a high-speed mixer/granulator, but in the absence of particulate auxiliaries to improve the surface properties, granulation and an increase in surface density to at least 650 g/l being achieved.

EP-A-0 352 135 relates to a process for the production of a granular detergent composition or components thereof which have a bulk density of at least 650 g/l, this process comprising the neutralization of a liquid acid precursor of an anionic surfactant with a solid water-soluble alkaline inorganic material and being characterized in that the particulate, solid, water-soluble, alkaline inorganic material is first fluidized with an excess quantity which would be necessary for neutralization, optionally in the presence of at least one other particulate solid, in a high-speed mixer with a stirring and cutting function, an acid precursor is gradually added to the high-speed mixer/granulator at a temperature not exceeding 55° C. and the acid precursor is neutralized with the water-soluble, alkaline inorganic substance while the mixture remains particulate, followed by granulation of the mixture in a high-speed mixer/granulator in the presence of a liquid binder.

EP-A-0 526 978 relates to a process for the production of alkali metal silicate granules in which a 30 to 53% by weight alkali metal silicate solution with an $SiO_2:M_2O$ molecular ratio of 1.5:1 to 3.3:1 is converted into granules with a mean diameter of 0.2 to 2 mm in a single drying and granulation step, the silicate solution being introduced into a drum with a plurality of rotating arms at temperatures of 150° C. to 200° C. and a gas, preferably vaporous air, being introduced into the drum at a temperature of about 175° C. to 250° C.

Accordingly, granulation in a mixer/granulator, even in the presence of liquid binders, more particularly in the presence of nonionic surfactants, water or aqueous solutions and gas is known.

A disadvantage in cases where water is used as the granulation aid is that the water either remains completely in the product or has to be at least partly removed again by drying. In the absence of drying, however, the products obtained in most cases are tacky, i.e. no longer flow freely, and cannot be stored. This drying step can again result in "degranulation" and in destruction of the products by friction.

Now, the problem addressed by the present invention was to provide a granulation process which would not have any of these disadvantages and which could be carried out without a subsequent drying step.

According to the invention, the solution to this problem is characterized in that water in its vaporous state is used in a special quantity as the granulation aid.

DESCRIPTION OF THE INVENTION

Accordingly, the present invention relates to a process for the production of granular detergents/cleaners or components thereof in a mixer with the assistance of a granulation aid, characterized in that the granulation aid used is water in its vaporous state which produces liquid water in situ on at least part of the components to be granulated, the water taken up amounting to between 0.1 and 2% by weight, preferably to between 0.1 and 1.0% by weight and more preferably to between 0.1 and 0.4% by weight, based on the detergent/cleaner to be granulated.

In the context of the present invention, water in its vaporous state is, preferably, water with temperatures of about 140° C., corresponding to about 4 bar, to 180° C., corresponding to about 10 bar.

Any mixer or granulator which enables vaporous water to be introduced into the granulation mixture is suitable for the purposes of the invention.

Mixers for dry and moist bulk materials of the type marketed by Draiswerke GmbH, Mannheim, Germany, are particularly suitable for this purpose. These mixers are ring layer mixers of the K-TT type. Key features of this type of mixer include the protection against wear provided by tungsten carbides and/or cermets, the use of a centrifugal spraying effect and/or two-component spraying and also an automatic control system which provides constant results in special granulation processes. Other suitable mixers are marketed by Machinenfabrik Gustav Eirich, Hardheim, Germany. Other suitable mixers which may be used in accordance with the invention are the Gericke multistream fluid mixers (Gericke, Rielasingen, Germany) which require very short mixing times. Mixers such as these operate with a Froude number of $\leq 1$. Other suitable mixers are rapid mixers or multistream fluid mixers. Other known mixers are marketed by Zeppelin-Metallwerken GmbH, Friedrichshafen, Germany. A review of mixers suitable for use in accordance with the invention can be found in Chem.-Ing.-Tech. 60 (1988), No. 12, pages 986 to 994.

Other suitable mixers—normally known as plowshare mixers—are marketed by Lödige Machinenbau GmbH and are the subject of German patent applications 41 24 984, 41 15 496, 37 28 710, 33 44 531, 28 01 460, 27 29 477, 27 05 077 and 39 35 290.

Another review of such mixers can be found in an article in "Die Ernährungsindustrie, No. ½, 1994, pages 16 et seq.

However, largely closed mixer/granulators, in which Froude numbers of 0.5 to 20 can be reached and which have a cylindrical wall and a mixer shaft arranged in the cylinder axis to which at least one mixing tool is fixed are particularly preferred. In these mixer/granulators, the Froude number indicates the ratio of the centrifugal force based on the diameter of the mixing tools and the rotational speed to the force of gravity. For example, with a Froude number below about 1, most of the material being mixed lies at the lowest point of the mixer. With a Froude number of 1 to 10, the material being mixed is distributed throughout the mixer, mainly in the form of a cloud. In this Froude number range, numerous statistical changes of place occur. With a Froude number above 10, the material being mixed is mainly pressed onto the inside of the mixer on which it lies in the form of a dense layer. Further definitions of the "Froude number" can be found in Römpp's Chemielexikon, 9th Edition, Vol. 2, 1990, page 1447, left-hand column.

In the preferred mixer/granulators, the mixing tools move through rotation of the mixer shaft, hence the name dynamic mixers. Other suitable mixer/granulators are mixers in which the mixing tools are static and the wall of the container rotates.

In addition to cylindrical mixer/granulators, conical mixer/granulators may also be used. In their case, too, the material being mixed is homogenized in the mixer in the form of a cloud. The same applies to all other mixers.

Granulation with water in its vaporous state in accordance with the invention has the advantage that preferably no more than 1.0% by weight and, more preferably, no more than 0.4% by weight of water is introduced into the product.

In one preferred embodiment of the present invention, the substances to be granulated consist of at least one solid or several solids. In addition to the solids, however, liquids may also be used, more particularly one or more non-aqueous liquids. In another preferred embodiment, any liquid, paste form or wax-like components of detergents/cleaners, which are present in a form in which they can be sprayed under the corresponding granulation conditions, may be used as the non-aqueous liquids. Preferred components of the type in question are primarily nonionic surfactants, fabric softeners and also foam inhibitors, more particularly silicone oils and/or paraffins and/or perfume oils.

Preferred nonionic surfactants include alkoxylated, advantageously ethoxylated, propoxylated or ethoxylated and propoxylated alcohols, more particularly primary alcohols, preferably containing 8 to 18 carbon atoms. More particularly, an average of 1 to 12 moles of alkylene oxide, preferably ethylene oxide (EO), per mole of alcohol is present in these surfactants in which the alcohol radical may be linear or, preferably, 2-methyl-branched or may contain linear and methyl-branched radicals in the form of the mixtures typically present in oxo alcohol radicals. However, alcohol ethoxylates containing 12 to 18 carbon atoms, for example of coconut fatty alcohol, palm oil fatty alcohol, tallow fatty alcohol or oleyl alcohol, and an average of 2 to 8 EO per mole of alcohol are particularly preferred. Preferred ethoxylated alcohols are, for example, $C_{12-14}$ alcohols containing 3 EO or 4 EO, $C_{9-11}$ alcohol containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 5 EO. The degrees of ethoxylation mentioned represent statistical mean values which, for a special product, may be a whole number or a broken number. Preferred alcohol ethoxylates have a narrow homolog distribution (narrow range ethoxylates, NRE). In addition to these nonionic surfactants, fatty alcohols containing more than 12 EO may also be used. Examples of such fatty alcohols are mixtures of alcohols containing 2 to 8 EO and tallow fatty alcohol containing 14 EO, 25 EO, 30 EO or 40 EO. However, mixtures of these nonionic surfactants with anionic sulfonate and/or sulfate surfactants typically present in detergents/cleaners may also be used providing these mixtures can be sprayed into the granulator at the temperatures prevailing under granulation conditions.

In one particularly preferred embodiment of the invention, however, one or more solids may be granulated without the addition of liquids irrespective of whether they are aqueous or non-aqueous.

One particular advantage of the process according to the invention, more particularly the process carried out without the addition of liquids, is that very fine-particle solids, i.e. solids which have a particle size of <0.4 mm or which even contain large amounts of dust, can be granulated. In order to utilize this advantage, at least part of the solids to be granulated, preferably 5 to 50% by weight and more preferably 5 to 20% by weight, based on the solids as a whole, consist of fine particles or dust. According to the invention, the fine-particle or dust-like solids include any solid substances, particularly those used in detergents/cleaners, which have a particle size distribution in which at least 5% by weight of the particles are smaller than 0.1 mm in diameter (sieve analysis).

These preferred solids include above all anionic surfactants, such as alkyl benzenesulfonates, olefin sulfonates, alkane sulfonates and alk(en)yl sulfates. Alk(en)yl sulfates in particular contain from their production large amounts of fine particles or dust where they are formed as products with predominantly amorphous components in the course of standard spray drying processes. The products treated by steam granulation in accordance with the invention have a particle size distribution in which normally more than 50% by weight and preferably more than 80% by weight of the particles are larger than 0.2 mm in size and smaller than 1.25 mm in size. Thus, compared with a normal starting material, which has a relative maximum at >0.2 mm and another maximum at >0.1 mm and which contains a broad spectrum of particles with a dust-fine particle size of <0.1 mm, there is a considerable reduction in the dust content to a product with a dust content reduced by more than 15%, i.e. with a dust content of preferably <0.1% by weight, as determined by the air jet sieving process described in DIN ISO 3310 (February 1992).

Another preferred embodiment of the process according to the invention is characterized in that the components to be granulated are fine-particle or dust-fine components from granulation processes using typical granulation aids, for example water or gas.

Suitable alk(en)yl sulfates are the alkali metal salts and, in particular, the sodium salts of the sulfuric acid semiesters of $C_{12-18}$ fatty alcohols, for example cocofatty alcohol, tallow fatty alcohol, lauryl, myristyl, cetyl or stearyl alcohol, or the $C_{10-20}$ oxo alcohols and semiesters of secondary alcohols with this chain length. Other preferred alk(en)yl sulfates are those with the chain length mentioned which contain a synthetic, linear alkyl chain based on a petrochemical and which are similar in their degradation behavior to the corresponding compounds based on oleochemical raw materials. $C_{16-18}$ alk(en)yl sulfates are particularly preferred from the point of view of washing technology. It can also be of particular advantage, especially for machine detergents, to use $C_{16-18}$ alk(en)yl sulfates in combination with relatively low-melting anionic surfactants and, in particular, with anionic surfactants which have a lower Krafft point and which have a lower tendency to crystallize at relatively low washing temperatures, for example from room temperature to 40° C. In one preferred embodiment of the invention, therefore, the detergents/cleaners contain mixtures of short-chain and long-chain fatty alkyl sulfates, preferably mixtures of $C_{12-14}$ fatty alkyl sulfates or $C_{12-18}$ fatty alkyl sulfates with $C_{16-18}$ fatty alkyl sulfates and, in particular, mixtures of $C_{12-18}$ fatty alkyl sulfates with $C_{16-18}$ fatty alkyl sulfates. However, another preferred embodiment of the invention is characterized by the use of unsaturated alkyl sulfates with an alkenyl chain length of preferably $C_{16}$ to $C_{22}$ in addition to saturated alkyl sulfates. In this embodiment, mixtures of saturated sulfonated fatty alcohols consisting predominantly of $C_{16}$ and unsaturated, sulfonated fatty alcohols consisting predominantly of $C_{18}$, for example those derived from solid or liquid fatty alcohol mixtures of the HD-Ocenol® type (a product of Henkel KGaA), are particularly preferred. Ratios by weight of alkyl sulfates to alkenyl sulfates of 10:1 to 1:2 are preferred, ratios by weight of about 5:1 to 1:1 being particularly preferred.

In addition, fine-particle soaps may also be used in the process according to the invention in the quantities typically used in detergents or cleaners, for example 2 to 30% by weight and preferably 2 to 20% by weight.

Other preferred solids, more particularly solids with large fine-particle or dust components, are inorganic and organic builders. Particularly preferred builders are the normally very fine-particle spray-dried zeolite powders which have a mean particle size of less than 10 μm (as measured by the Coulter Counter Method). Zeolite A, X or P or mixtures of zeolite A and X or zeolite A and P may be used.

Other suitable builders are standard builders and complexing agents, for example phosphonates, the polycarboxylic acids preferably used in the form of their sodium salts, such as citric acid, adipic acid, succinic acid, glutaric acid, aminocarboxylic acid and nitrilotriacetic acid, providing their use is not objectionable on ecological grounds, and mixtures thereof, and co(polymeric) polycarboxylic acids or polycarboxylates, such as the sodium salts of polyacrylic acids or polymethacrylic acids, for example those with a relative molecular weight of 800 to 150,000 (based on acid), those of acrylic acid with methacrylic acid and of acrylic acid or methacrylic acid with maleic acid being particularly preferred. Also particularly preferred are biodegradable polymers of more than two different monomer units, for example those which contain salts of acrylic acid and maleic acid and vinyl alcohol or vinyl alcohol derivatives as monomers in accordance with DE-A-43 00 772 or salts of acrylic acid and 2-alkyl allyl sulfonic acid and sugar derivatives as monomers in accordance with DE-C-42 21 381. Other preferred copolymers are those which are described in German patent applications DE-A-43 03 320 and in P 44 17 734.8 and which preferably contain acrolein and acrylic acid/acrylic acid salts or acrolein and vinyl acetate as monomers.

Other suitable builders are polyacetals which may be obtained by reaction of dialdehydes with polyol carboxylic acids containing 5 to 7 carbon atoms and at least three hydroxyl groups, for example as described in European patent application EP-A-0 280 223. Preferred polyacetals are obtained from dialdehydes, such as glyoxal, glutaraldehyde, terephthalaldehyde and mixtures thereof and from polyol carboxylic acids, such as gluconic acid and/or glucoheptonic acid.

Other suitable solids are water-soluble inorganic salts, such as bicarbonates, carbonates, amorphous silicates or mixtures thereof. Alkali metal carbonate and amorphous alkali metal silicate, above all sodium silicate with a molar $Na_2O:SiO_2$ ratio of 1:1 to 1:4.5 and preferably 1:2 to 1:3.5, are particularly suitable. In the context of the invention, the term "amorphous" is also understood to encompass "X-ray amorphous". In other words, the silicates do not produce any of the sharp X-ray reflexes typical of crystalline substances in X-ray diffraction experiments, but at best one or more maxima of the scattered X-radiation which have a width of several degrees of the diffraction angle. However, it is quite possible—and may even lead to particularly good builder properties—that the silicate particles produce crooked or even sharp diffraction maxima in electron diffraction experiments. This may be interpreted to mean that the products have microcrystalline regions between 10 and a few hundred nm in size.

These inorganic and alkaline salts are also preferably used in forms characterized by a high percentage content of fine particles or dust.

According to the teaching of German patent application DE 43 19 578, alkali metal carbonates may also be replaced by sulfur-free amino acids containing 2 to 11 carbon atoms and optionally another carboxyl and/or amino group and/or salts thereof. In a preferred embodiment of the present invention, the alkali metal carbonates are partly or completely replaced by glycine or glycinate. Other ingredients which may be used are, for example, the following:

Soil repellents which, in general, consist of very fine particles and, for this reason, are mostly applied to a sodium sulfate carrier. Bleaching agents, for example sodium perborate, sodium percarbonate, sodium perphosphate and percarbamide, are also mentioned. However, sodium perborate dust is preferably used.

Another ingredient may be, for example, a fine-particle bleach activator based on tetraacetyl glycoluril (TAGU) or tetraacetyl ethylenediamine (TAED), fine-particle TAED in the form of dust from coarse particles preferably being used. Other ingredients which may be used in the granular detergents/cleaners include fine-particle phosphonates and, for example, typical redeposition inhibitors based on chemically modified polysaccharides, for example correspondingly highly substituted carboxymethyl cellulose or carboxymethyl starch, preferably very fine-particle carboxymethyl cellulose. Other ingredients which may optionally be added to the detergents/cleaners include optical brighteners, such as cotton brighteners, chlorine-resistant brighteners, polyamide and polyester brighteners, the very fine-particle and versatile stilbene derivatives being preferred. Finally, other suitable ingredients are dye transfer inhibitors, which are generally very fine, such as polyvinyl pyrrolidone, and enzymes—but only if the granules normally encapsulated in the form of very coarse particles are destroyed by abrasion during a mixing process.

Accordingly, standard detergents/cleaners and components thereof can be produced in this way. The particle size distributions and bulk densities of the granules can be varied within wide limits through the mixing or granulation time and through the amount of steam used, i.e. through the temperature prevailing in the mixer/granulator.

EXAMPLES

Example 1

The granulation of light, calcined sodium carbonate (soda) was carried out in a mixer (type FKM 1200, Lödige Maschinenbau GmbH) with a volume of 1.2 m³. Before the addition of 300 kg of sodium carbonate (light, calcined soda, a product of Mathes & Weber GmbH, Duisburg, Germany, with a sodium carbonate content of 98.8 to 99.6% and a bulk density of about 0.6 kg/l), water in its vaporous state was introduced for 30 seconds and cooled below its condensation point. 300 kg of soda were then added and, after mixing for 3 minutes, were treated with the water in its vaporous state twice for 10 seconds during the second mixing (again 3 minutes). In this way, the bulk density of the sodium carbonate was increased from around 600 g/l to 733 g/l. In addition, the percentage of particles smaller than 0.1 mm in diameter in the sodium carbonate was significantly reduced. An overview of the data obtained can be found in Table 1 below which shows the particle size distribution (as measured in accordance with ISO 3310, February 1992), the water content (as measured in accordance with DGF-C-III 13 a) and the bulk density (as measured in accordance with DIN ISO 697).

Table 1

Granulation of Light $Na_2CO_3$ (quantities in % by weight)

|  | Soda, Calc. According to the Manufacturer | Soda, Calc. Granules |
|---|---|---|
| Particle size distribution |  |  |
| >1.60 mm |  | 0.3 |
| >1.00 mm |  | 0.2 |
| >0.80 mm |  | 1.3 |
| >0.50 mm | 3.1 | 4.7 |
| >0.40 mm |  | 2.7 |
| >0.20 mm | 10.7 | 7.5 |
| >0.10 mm | 38.8 | 40.1 |
| <0.10 mm | 47.4 | 43.2 |
| Water content (in % by weight) | <0.1 | 0.3 |
| Bulk density (g/l) | 600 | 733 |
| Increase in bulk density |  | +22.2% |

Example 2

Granulation of Compacted Soda (C-soda)

The treatment procedure of Example 1 was repeated using compacted sodium carbonate (C-soda) instead of light, calcined soda. In this case, the bulk density of an already compacted type was again significantly increased from 960 g/l to 1040 g/l. The percentage of particles ≦0.1 mm in diameter was also significantly reduced. The data obtained are set out in Table 2 below which shows the particle size distribution, water content and bulk density determined as indicated above.

Table 2

Granulation of Compacted $Na_2CO_3$ (quantities in % by weight)

|  | C-Soda # | C-Soda Granules |
|---|---|---|
| Particle size distribution |  |  |
| >1.60 mm | 1.3 | 1.6 |
| >1.00 mm | 5.5 | 9.0 |
| >0.80 mm | 3.7 | 5.8 |
| >0.40 mm | 17.7 | 25.0 |
| >0.20 mm | 24.9 | 7.2 |
| >0.10 mm | 16.6 | 26.6 |
| <0.10 mm | 30.3 | 24.8 |
| Water content (in % by weight) | 0.1 | 0.4 |
| Bulk density (g/l) | 960 | 1,040 |
| Increase in bulk density |  | +8.3% |

Freshly produced by granulation with water in accordance with the above-cited prior art Example 3

Granulation of a $C_{12/18}$ Fatty Alcohol Sulfate Neutralizate (FAS)

This Example was carried out using a fatty alcohol sulfate neutralizate (FAS) with the following composition: 85% by weight of $C_{12/18}$ fatty alcohol sulfate sodium sulfate salt (typically consisting of 20 to 30% by weight of $C_{12/14}$ and 70 to 80% by weight of $C_{16/18}$), 5% by weight of water and ca. 10% by weight of sodium sulfate and/or fatty alcohol with the characteristic data shown in Table 3 below, i.e. a special particle size distribution, water content, bulk density and a residue after the hand washing test. The column headed "Mixer Inv. (mixer according to the invention)" shows the particle size distributions, the dust content, the bulk density, the lump test and the residue of a product which has been subjected to steam granulation in accordance with the invention. The particle size distributions and other characteristic data obtained in the treatment of a starting material in a mixer to which water is added (in a quantity of 2 to 3% by weight, based on the starting product) are shown for comparison.

As the comparison test shows, the starting material treated with water in accordance with the prior art has a higher dust content with a particle size below 0.1 mm. In addition, the result obtained in the lump test is twice as unfavorable as that of products treated in accordance with the invention so that the product produced in accordance with the prior art has less strength in transit. Finally, the bulk density obtained is more unfavorable than in the present invention.

The steam granulation process according to the invention itself is carried out as follows on the fatty alcohol sulfate neutralizate:

Before the addition of 300 kg of FAS spray neutralizate, a mixer with a volume of 1.2 m³, of which the mixing elements were operated at a rotational speed of about 120 r.p.m., was treated for 15 seconds with water in the vaporous state (for example water with an operating pressure of 4 bar at a temperature of 100° C.) and then cooled below its condensation point. The FAS was then introduced into the mixer and mixed for 8 minutes. The bulk density and percentage residue were determined along with the lump test value (500 g weight). The results are set out in the following Table.

Table 3

Granulation of FAS (quantities in % by weight)

|  | Starting Material | Mixer Inv. $H_2O$ (g) | Mixer $H_2O$ (l) |
|---|---|---|---|
| Particle size distribution |  |  |  |
| >1.60 mm | 1.5 | 4.5 | 0.8 |
| >1.25 mm | 2.8 | 2.2 | 5.1 |
| >0.20 mm | 57.9 | 81.0 | 79.0 |

-continued

| | Starting Material | Mixer Inv. H$_2$O (g) | Mixer H$_2$O (l) |
|---|---|---|---|
| >0.10 mm | 30.2 | 11.2 | 13.6 |
| <0.10 mm | 7.6 | 1.1 | 1.5 |
| Water content (in % by weight) | 5.0 | 5.4 | 7.3 |
| Bulk density (in g/l) | 326 | 590 | 380–510 |
| Lump test (500 g weight)# | 430 | 160 | 390 |
| Residue (in % by weight)## | 27.1 | 28.5 | 38.5 |

Indicates the quantity (in g) starting from 500 g which remains behind as lumps, i.e. expresses maximum strength in transit.
The percentage residue is determined by a hand washing test in which the value obtained should be as low as possible.

Example 4

The procedure of Example 1 or Example 2 was repeated using a corresponding sodium tripolyphosphate instead of the sodium carbonate. The bulk density was increased from 795 g/l to a value of 860 g/l.

Example 5

Detergent Granules

A detergent formulation consisting of about 40% by weight of compacted soda, about 26% by weight of water-free sodium tripolyphosphate, about 15% by weight of sodium silicate, about 5% of peroxy bleaching agent, about 2% of a surfactant mixture consisting of
50% by weight of a C$_{12-18}$ fatty alcohol·5 EO and
50% by weight of a C$_{12-14}$ fatty alcohol·2 EO·4 PO and sodium sulfate as the balance, was granulated by the process of treatment with water in the vaporous state described in Examples 1 to 3. The bulk density of this detergent containing C-soda was increased to a value of 1040 g/l. The dust fraction (<0.1 mm) of 25% by weight was well below the fraction normally obtained.

Without the process according to the invention, a bulk density of only about 960 g/l and a dust fraction (<0.1 mm) of about 30% by weight are obtained.

What is claimed is:

1. A process for producing granular detergents, cleaners or components thereof from dust solids comprising anionic surfactants or soaps having a particle size distribution wherein at least 5% by weight of said solids have a diameter smaller than 0.1 mm, consisting essentially of placing said solids in a moving mixer and adding water in its vaporous state to said solids whereby said water in its vaporous state forms liquid water on at least part of said solids in an amount from 0.1% to 2% by weight, based on the weight of said granular detergents, cleaners or components thereof.

2. A process as in claim 1 wherein said water is present in said solids in an amount of from 0.1% to 1% by weight, based on the weight of said granular detergents, cleaners or components thereof.

3. A process as in claim 1 wherein said water in its vaporous state is at a temperature of from 140° C. to 180° C.

4. A process as in claim 1 wherein said solids are granulated in the absence of a liquid.

5. A process as in claim 1 wherein said solids further contain one or more non-aqueous liquid.

6. A process as in claim 5 wherein said non-aqueous liquid is selected from the group consisting of nonionic surfactants, fabric softeners, foam inhibitors, and perfume oils.

7. A process as in claim 1 wherein at least 5% to 50% by weight, based on said solids, are fine particles or dust.

8. A process as in claim 1 wherein said solids to be granulated comprise fine-parlicle or dust components obtained from granulation processes using water or gas.

9. A process as in claim 1 wherein said solids further comprise inorganic and organic builders.

10. A process as in claim 9 wherein said granular detergents, cleaners or components thereof have a higher bulk density than said dust solids.

* * * * *